United States Patent [19]

Dwyer et al.

[11] Patent Number: 4,641,261

[45] Date of Patent: Feb. 3, 1987

[54] UNIVERSAL INTERFACE CIRCUIT FOR MICROPROCESSOR PERIPHERALS

[75] Inventors: Robert A. Dwyer, Readington Township, Hunterdon County; Russell G. Ott, Cranford Township, Union County, both of N.J.

[73] Assignee: RCA Corporation, Princeton, N.J.

[21] Appl. No.: 612,427

[22] Filed: May 21, 1984

[51] Int. Cl.[4] .............................................. G06F 13/42
[52] U.S. Cl. .................................................... 364/900
[58] Field of Search ... 364/200 MS File, 900 MS File

[56] References Cited

U.S. PATENT DOCUMENTS

| 4,287,563 | 9/1981 | Huston, Jr. | 364/200 |
| 4,390,963 | 6/1983 | Puhl et al. | 364/900 |
| 4,390,969 | 6/1983 | Hayes | 364/900 |

Primary Examiner—James D. Thomas
Assistant Examiner—Michael J. Ure
Attorney, Agent, or Firm—Joseph S. Tripoli; Robert L. Troike; Raymond E. Smiley

[57] ABSTRACT

A universal interface adaptor circuit (UIAC) for connecting any one of a plurality of either of two general microprocessor types to a peripheral device using the same interface connections to selectively generate and supply either a WRITE ENABLE signal or a READ ENABLE signal to a peripheral device. A first of the two general types of microprocessors is used in multiplexed-bus multiprocessor (MBM) systems and the second of the two general types of microprocessors is used in non-multiplexed-bus microprocessor (NMBM) systems, where the microprocessors used in both the MBM and the NMBM systems each supply three output signals for determining whether the function is a READ or a WRITE function and the time of occurrence of such READ or WRITE function. The UIAC comprises logic array having three input terminals X, Y, and Z for receiving the three output signals from each of the microprocessors employed in either the MBM systems or the NMBM systems. First selected logic elements of the logic array respond to the three output signals received from the MBM type systems to produce a READ ENABLE signal when the signals thereon indicate a READ function and a WRITE ENABLE signal when the signals thereon indicate a WRITE function, and second selected logic elements of the logic array respond to the three output signals received from the NMBM type systems to produce a READ ENABLE signal when the signals thereon indicate a READ function, and to produce a WRITE ENABLE signal when the signals thereon indicate a WRITE function.

8 Claims, 13 Drawing Figures

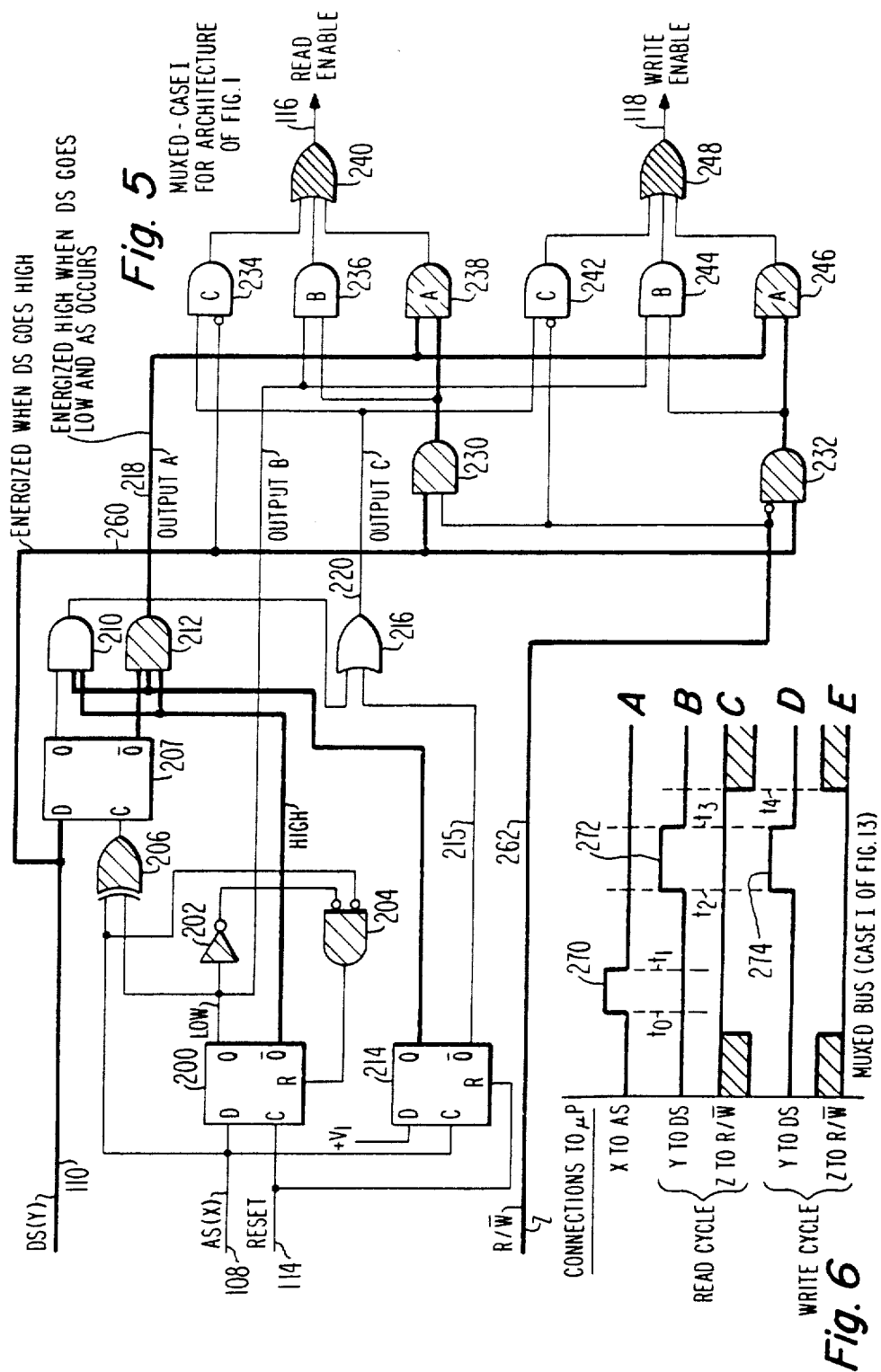

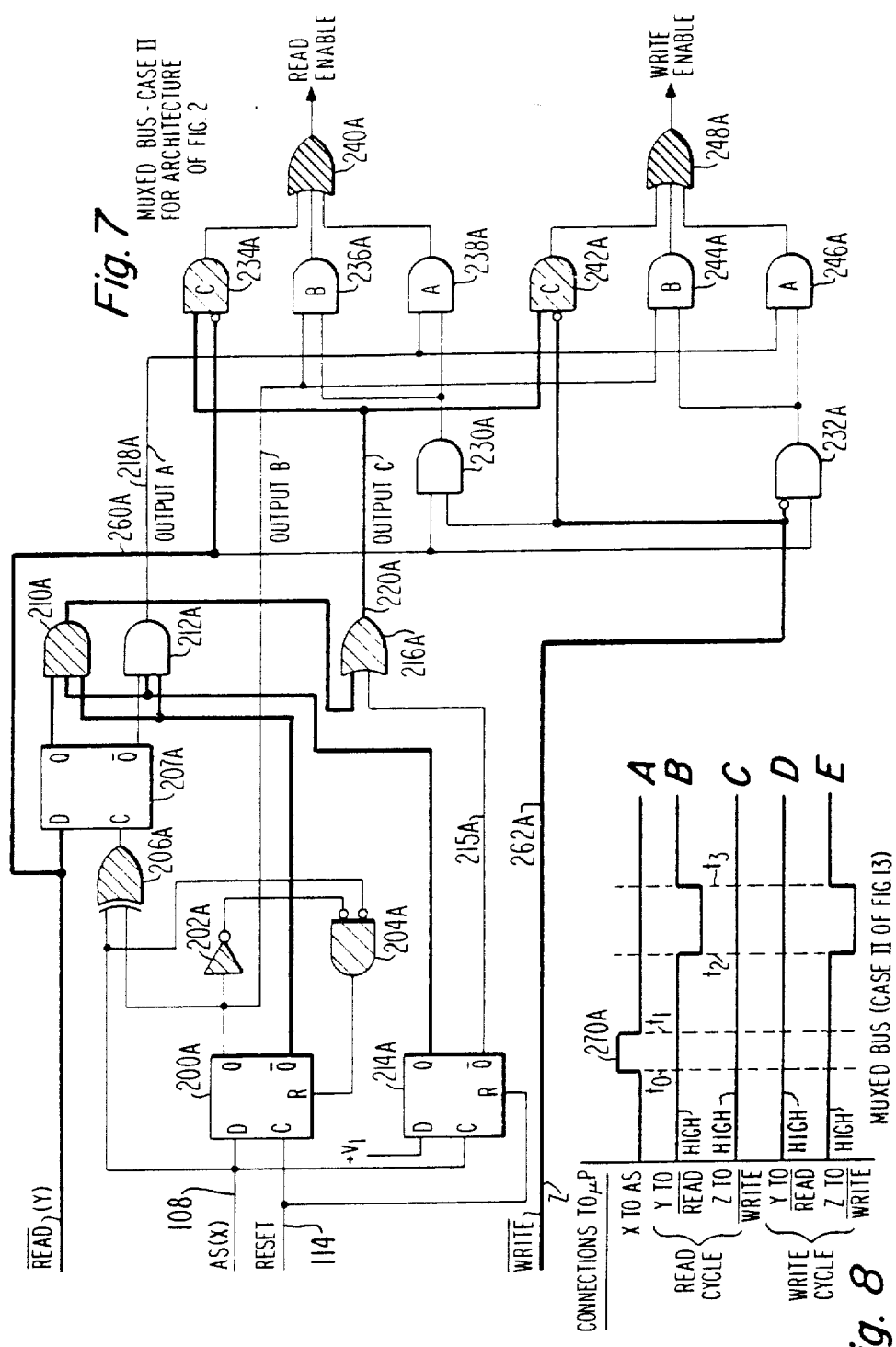

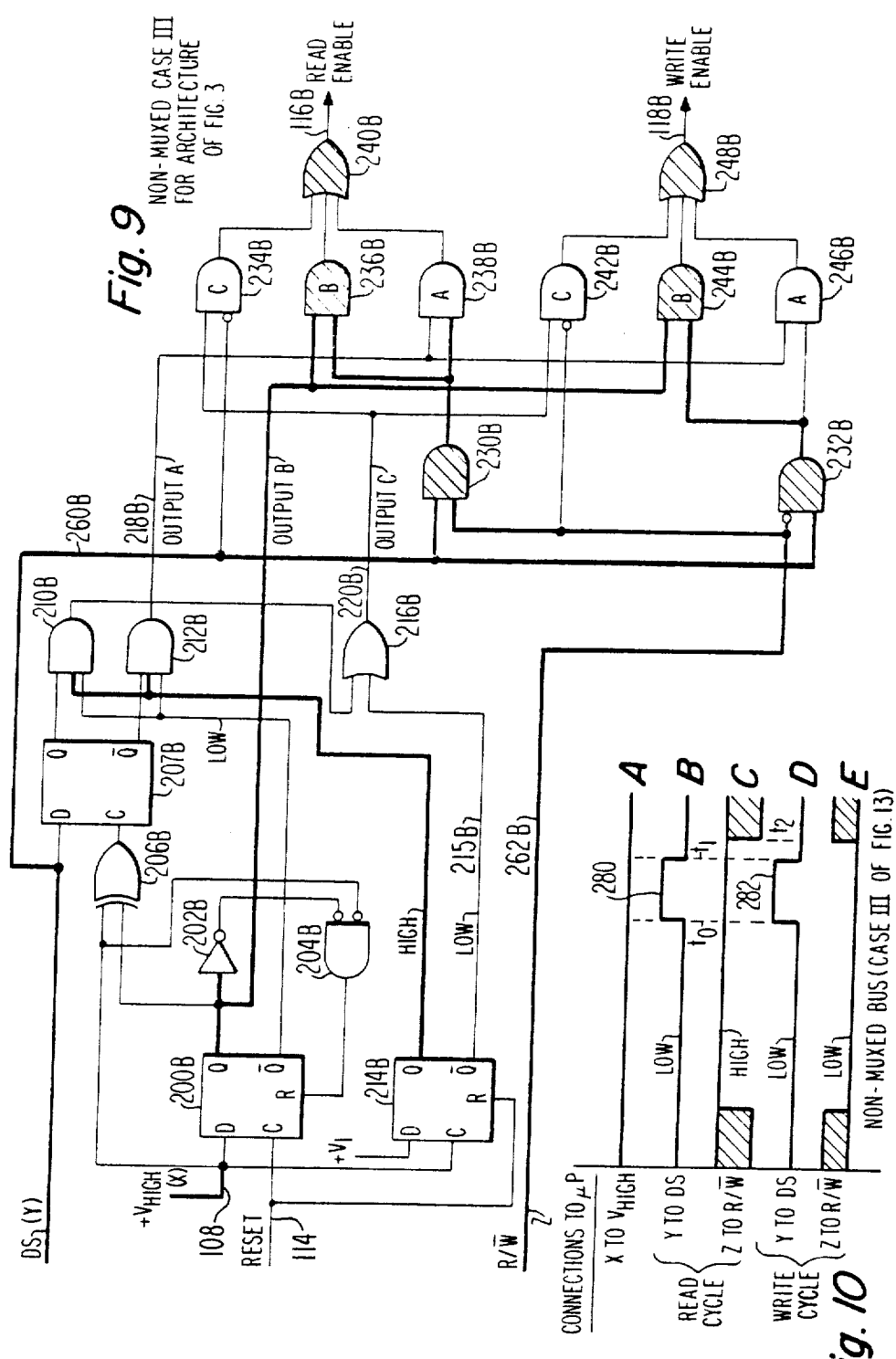

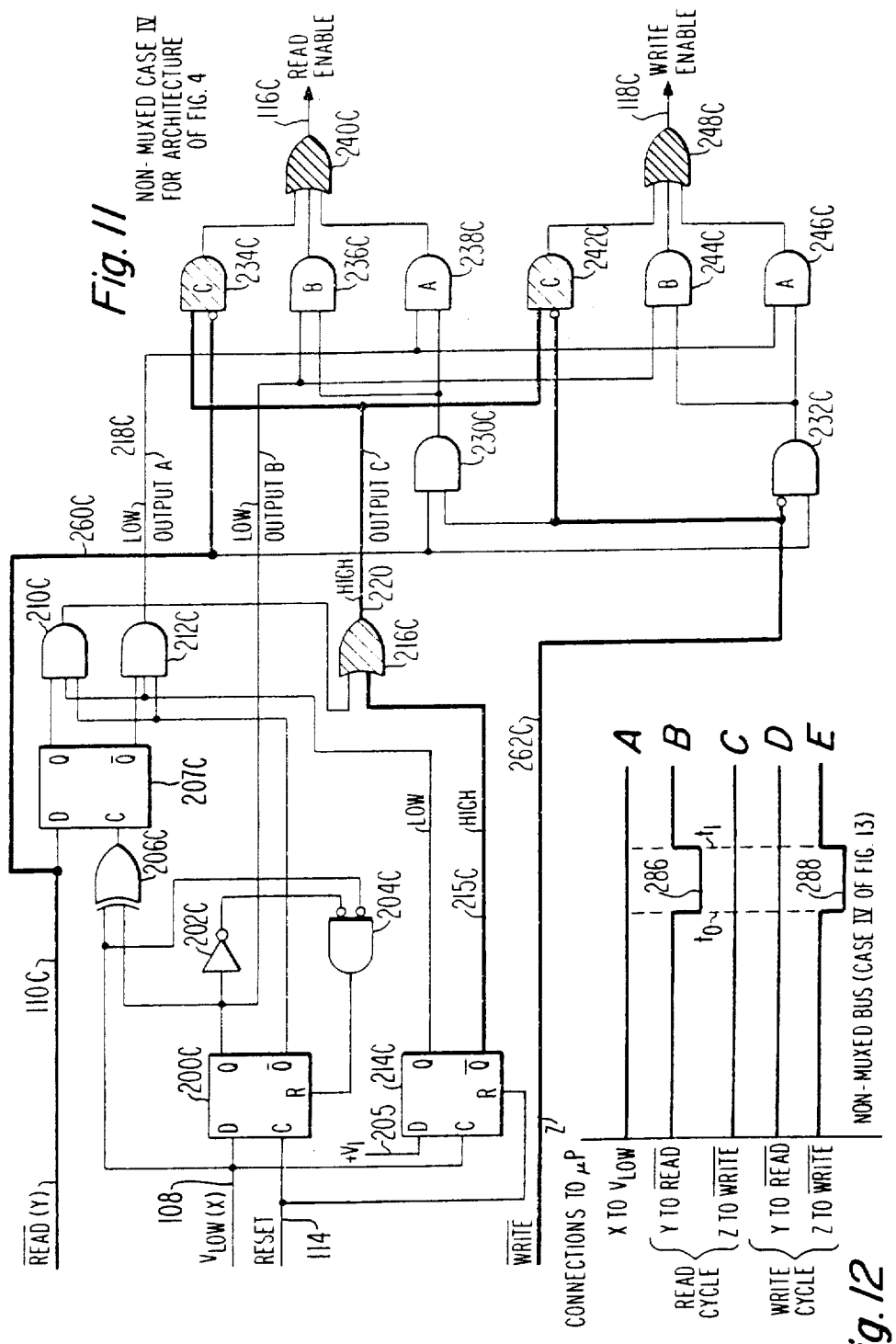

CONNECTIONS FROM DIFFERENT TYPES OF μ PROCESSORS TO UNIVERSAL ADAPTER CIRCUIT

| UNIVERSAL ADAPTER CIRCUIT INPUT TERMINALS | CASE I<br>INPUTS TO MUXED BUS USING ARCHITECTURE OF FIG. 5 | CASE II<br>INPUTS TO MUXED BUS USING ARCHITECTURE OF FIG. 7 | CASE III<br>INPUTS TO NON-MUXED BUS USING ARCHITECTURE OF FIG. 9 | CASE IV<br>INPUTS TO NON-MUXED BUS USING ARCHITECTURE OF FIG. 11 |
|---|---|---|---|---|
| X | AS | AS | $V_{HIGH}$ | $V_{LOW}$ |
| Y | DS | $\overline{READ}$ | DS | $\overline{READ}$ |
| Z | R/$\overline{W}$ | $\overline{WRITE}$ | R/$\overline{W}$ | $\overline{WRITE}$ |
| RESET | RESET | RESET | RESET | RESET |

LEGEND:
AS ⟹ ADDRESS STROBE
DS ⟹ DATA STROBE
R/$\overline{W}$ ⟹ READ AND WRITE COMMANDS ON SAME LINE
$\overline{READ}$, $\overline{WRITE}$ ⟹ READ AND WRITE COMMANDS ON SEPARATE LINES
$V_{HIGH}$ ⟹ HIGH LOGIC VOLTAGE LEVEL (LOGIC 1)
$V_{LOW}$ ⟹ LOW LOGIC VOLTAGE LEVEL (LOGIC 0)

*Fig. 13*

UNIVERSAL INTERFACE CIRCUIT FOR MICROPROCESSOR PERIPHERALS

This invention relates to interface adaptor circuits for connecting microprocessors to peripheral devices and, more particularly, to a universal interface adaptor circuit for making such connections.

Microprocessors (μP's) can be classified into two general categories based on whether address information is multiplexed or not multiplexed onto their common data busses. They can also be classified according to the type of read and write control signals which they generate. More specifically, some microprocessors generate a read and a write signal on separate lines and others generate a read and write signal on the same line and a data strobe timing pulse on a separate line. In the case of read and write signals generated on separate lines, the timing or strobing data is incorporated within the read and write control signals. In the second case where the read/write signal is generated on the same line, such read/write signal indicates a direction of data transfer on the microprocessor's data bus but is valid for a period of time which is too long to allow it to be employed as a strobe for latching that data. Consequently, a data strobe pulse is required for latching valid data and occurs during the read/write signal.

Either of the above mentioned two types of read/write controls, i.e., read/write control signals on a single line or on separate lines, can be used by a system of microprocessors comprising a plurality of microprocessors either with a multiplex or a non-multiplex data bus, thereby creating four different basic architectural situations, each requiring a different basic microprocessor interface. It is desirble to design peripheral device chips which interface with various microprocessors without any additional interface circuitry. However, in a system employing a number of microprocessors and a number of peripheral devices, the number of interfaces makes this task difficult, requiring much hardware and expense. The interface circuit between each peripheral device and each different type microprocessor requires a different interface.

It is further desirable to have a single interface circuit which could be placed on the same chip as the control circuitry for a given peripheral device and which would be common to all peripheral devices and compatible with all four types of microprocessor interfaces. While it might appear that this might be done by brute force techinques by simply placing the logic necessary for each different interface on a common chip for all four types of microprocessors, such an approach is not feasible since it would require a very large number of input pins on the chip which would be a very inefficient use of the available pins and would lead to unacceptable cost and/or fewer I/O functions.

SUMMARY OF THE INVENTION

The present invention marks a definite improvement in the art in that it provides a universal interface adaptor circuit (UIAC) which connects peripheral devices directly to all four types of microprocessor interfaces without requiring additional input signals over that required to connect any one of the four microprocessor interfaces to a peripheral device by prior art techniques.

In accordance with one preferred embodiment of the invention there is provided a universal interface adaptor circuit (UIAC) for connecting a plurality of two general microprocessor types to a peripheral device to selectively generate and supply either a WRITE ENABLE signal or a READ ENABLE signal to the peripheral device. A first of the two microprocessor types is used in multiplexed-bus microprocessor (MBM) systems and the second of the two general types of microprocessors is employed in non-multiplexed-bus microprocessor (NMBM) systems, where the microprocessor employed in both the MBM systems and the NMBM systems each generate three output signals for indicating whether the function is a READ or a WRITE function, and when such READ or WRITE function occurs, and comprising a logic array (the UIAC) collectively having three inputs X, Y, and Z for receiving signals on the three outputs of each of the microprocessors employed in either the MBM systems or the NMBM systems.

First logic elements of the UIAC logic array respond to the signals received by its X, Y, and Z inputs from the three outputs of the MBM systems to produce a READ ENABLE or a WRITE ENABLE signal when such three output signals indicate a READ or a WRITE function, respectively. Second logic elements of the logic array respond to the signals received by its X, Y, and Z inputs from the three outputs of the NMBM systems to produce a READ ENABLE or a WRITE ENABLE signal when such three output signals indicate a READ or a WRITE function, respectively.

BRIEF DESCRIPTION OF THE DRAWINGS

In the drawings:

FIG. 5 is a logic diagram of the common UIAC of FIGS. 1–4;

FIG. 6 is a set of waveforms showing the operation of the logic diagram of FIG. 5 when it is connected to the type of microprocessor shown in FIG. 1;

FIG. 7 is a logic diagram of the universal adaptor circuit of FIG. 2 which is identical to the UIAC of FIG. 1, exept that it will operate differently in response to the microprocessor of the type shown in FIG. 2;

FIG. 8 is a set of timing waveforms showing the operation of the logic diagram of the UIAC of FIG. 7 in response to the microprocessor shown in FIG. 2;

FIG. 9 is a logic diagram of the UIAC of FIG. 3 and is identical to that of the UIACs of FIGS. 1 and 2 except that it will operate differently in response to the output signals of the microprocessor shown in FIG. 3;

FIG. 10 is a set of timing waveforms showing the operation of the logic diagram of the UIAC of FIG. 9 in response to the type microprocessor shown in FIG. 3;

FIG. 11 is a logic diagram of the universal adaptor circuit of FIG. 4 and is identical to the UIACs of FIGS. 1, 2 and 3, except that it will operate differently in response to the output signals of the microprocessor shown in FIG. 4;

FIG. 12 is a set of timing waveforms showing the operation of the logic diagram of FIG. 11 in response to the output signals of the universal adaptor circuit of FIG. 11 in response to the type microprocessor shown in FIG. 4; and FIG. 13 is a chart relating the connections between the microprocessors of FIGS. 1, 2, 3 and 4 to the UIACs used in all of the four architectures shown in FIGS. 1–4.

Referring now to FIGS. 1–4, it can be seen that the same UIAC is employed in each of the four architectural arrangements of FIGS. 1–4, but which will respond in a different manner in accordance with the different types of microprocessors employed in the architectures of FIGS. 1–4. Consider the architecture of FIG. 1, for example. There microprocessor 100 is employed in a multiplexed bus system. It has an address strobe (AS) output terminal 108, a data strobe (DS) output terminal 110, and a read/write (R/W̄) output terminal 112, which are connected respectively to the X, Y and Z inputs of the UIAC 102. UIAC 102 is also shown in detail in FIG. 5.

A reset circuit 106 supplies a reset pulse via lead 114 to the rest inputs of microprocessor 100 and UIAC 102 to reset both the microprocessor 100 and the UIAC 102 prior to the transmission of a stream of data in the system.

Figure 1:
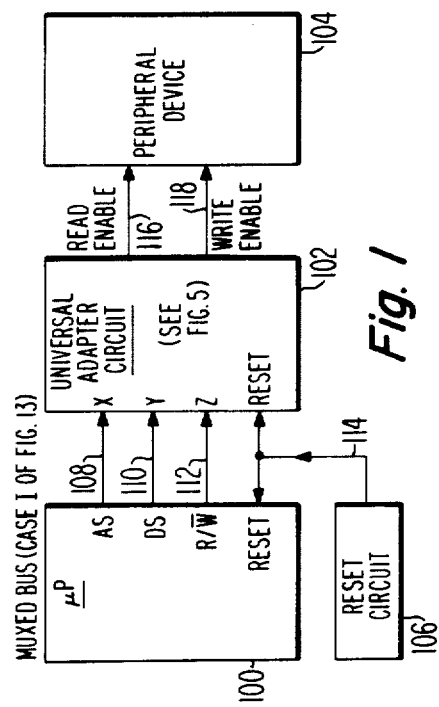

The connections of the architecture of FIG. 1 are shown in the vertical column labeled Case I of FIG. 13.

Figure 2:
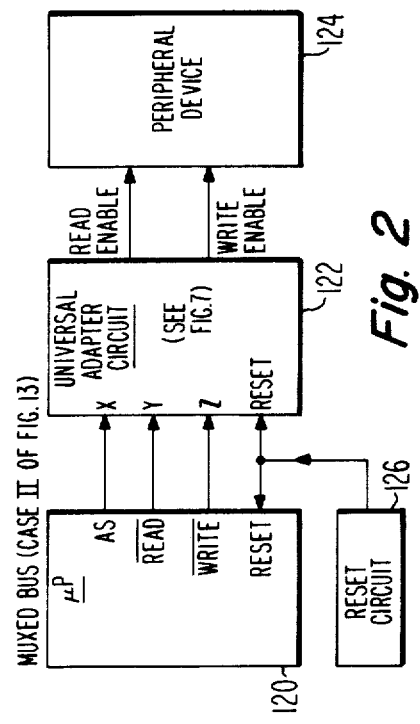
FIGS. 1–4 show the broad architectural arrangement of the four different types of microprocessors connected to a peripheral device by a common and identical universal adaptor circuit.

The microprocessor 120 shown in the architecture of FIG. 2 is also employed in a multiplexed bus system and has an output terminal A, a read output terminal, and a write output terminal, which are connected respectively to the X, Y and Z inputs of the UIAC 122. Such connections are shown in the vertical column labeled Case II of FIG. 13. The read and write commands are normally high and go exclusively to a low level to determine whether a read enable or a write enable signal is supplied to peripheral device 124.

Figure 4:
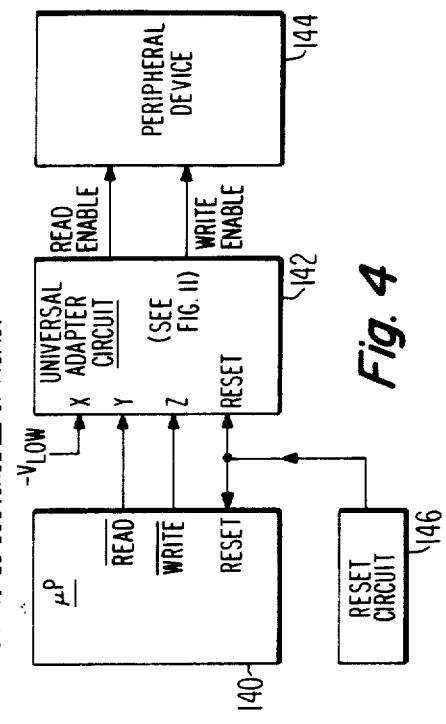
Figure 3:
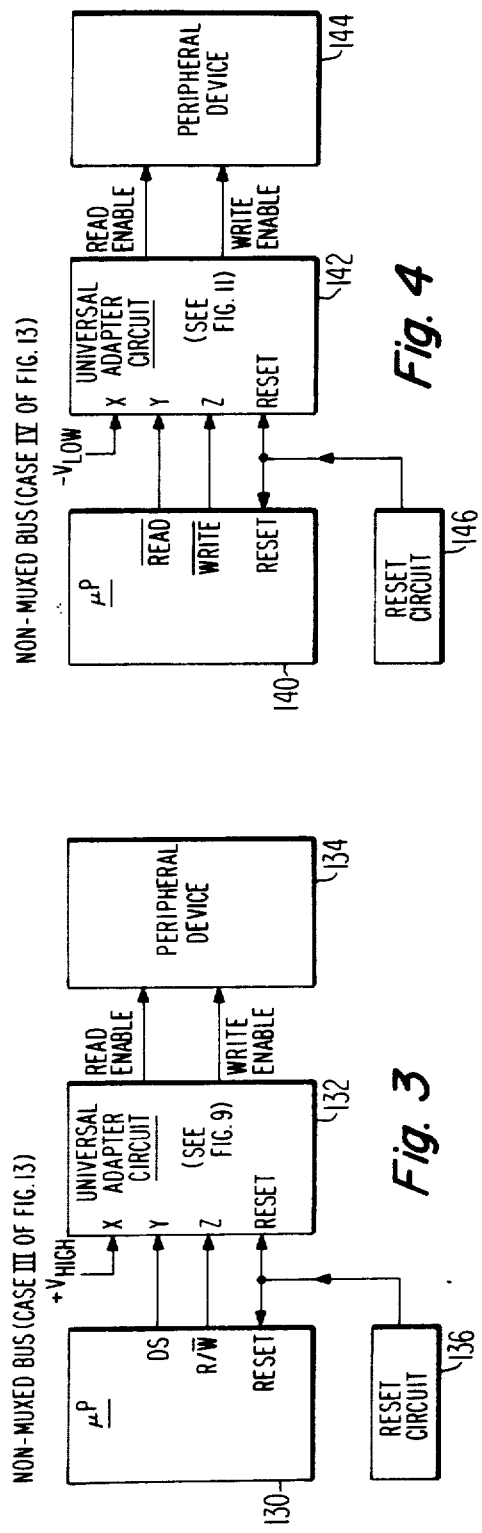

As in the case of the architecture of FIG. 1 and also in the case of the architectures of FIGS. 3 and 4, the reset circuit 126 functions to reset the microprocessor 120 and the UIAC 122 before the transmission of a stream of data.

In FIG. 3, there is shown a microprocessor 130 employed in a non-multiplexed bus system and having a data strobe (DS) output terminal, and a read/write (R/W̄) output terminal connected to the Y and Z inputs of the UIAC 132. A high logic voltage level ($V_{HIGH}$), is connected to the X input of UIAC 132. Depending upon the level of the single lead carrying the R/W̄ signal, the output of universal adaptor circuit 132 will be a READ ENABLE or a WRITE ENABLE signal which is supplied to a peripheral device 134.

In FIG. 4 there is shown a microprocessor 140 of the type employed in a non-multiplexed bus system. The microprocessor 140 has a read output terminal and a write output terminal which are connected respectively to the Y and Z inputs of the UIAC 142. A low logic voltage level ($V_{LOW}$), is connected to the X input of UIAC 142.

Depending upon the levels of the two signals read and write, which are mutually exclusive, the UIAC 142 will supply a read enable or a write enable signal to the peripheral device 144.

It is to be noted again that the UIACs 102, 122, 132 and 142, shown as a block in FIGS. 1–4 and shown in detail in FIGS. 5, 7, 9 and 11 have exactly the same logic. However, they perform different functions in that they respond differently to the output signal of the four different types of microprocessors 100, 120, 130 and 140 shown in FIGS. 1–4, as will be discussed in more detail in connection with FIGS. 5, 7, 9 and 11.

Referring now to FIGS. 5 and 6, there is shown the logic and timing waveforms of the UIAC 102 in response to a microprocessor of the type 100 shown in FIG. 1. In FIG. 5, those logic elements which become active in response to the output signals from microprocessor 100 of FIG. 1 are shaded. The unshaded logic elements, except for the three flip-flops 200, 214, and 207, are not active in the logic of FIG. 5 when responding to the output signals of the type of microprocessor shown as processor 100 in FIG. 1. The role of the three flip-flops 200, 214 and 207 will be explained in the following paragraph as the operation of the circuit of FIG. 5 is discussed.

The first function that occurs is generation of a reset pulse on input lead 114 which is supplied to the reset input of the UIAC of FIG. 5. This input pulse functions to clock flip-flop 200 and transfer the AS signal on the data (D) input thereof to the Q output thereof. Such AS signal, at the time of the trailing edge of the reset pulse, which occurs before time $t_0$ illustrated in the waveforms of FIG. 6, is a low or high level signal. If low, the Q output is a low level signal immediately after the occurrence of the reset pulse. If high, the Q output is a high level immediately after the occurrence of the reset pulse but will be reset low as soon as AS goes low by a high level at the output of gate 204. The reset pulse also functions to reset flip-flop 214 to cause the Q output thereof to go low until the occurrence of the next positive pulse on the AS signal line.

The reset pulse occurs before the time $t_0$ in the waveforms of FIG. 6, although such reset pulse is not shown specifically in any of the timing waveforms of FIG. 6. At time $t_0$ the address strobe (AS) pulse, shown as pulse 270 of waveform 6A, is supplied to input lead 108 of FIG. 5. However, since no clock pulse occurs during the pulse 270 the Q output of flip-flop 200 remains low. The AS pulse 270 is also supplied as a clock pulse to flip-flop 214 which will cause the Q output of flip-flop 214 to go high due to the high logic voltage level supplied to the data input thereof.

The AS pulse is also supplied to one input of Exclusive OR (XOR) gate 206. Since the other input to XOR gate 206 is low, the output of XOR gate 206 is a high level signal which clocks flip-flop 207 and supplies whatever signal level is at that time supplied to the D input of flip-flop 207 to the Q output thereof. As can be seen from timing waveform 6B, the DS (data strobe) output on input lead 110 is low during the time interval $t_0$–$t_1$ of the AS pulse 270 so that the Q output of flip-flop 207 remains a low level signal and the Q̄ output remains a high level signal to prime AND gate 212. Similarly, during the write cycle the signal level on the DS lead 110 of FIG. 5 is a low level during the AS pulse 270 (waveform 6A), so that the Q output of flip-flop 207 remains a low level signal and the Q̄ output thereof remains a high level signal. When the data strobe pulse occurs during either a read cycle (R/W̄ is high) or a write (R/W̄ is low) as represented by pulses 272 or 274 between time interval $t_2$–$t_3$ of waveform 6B or 6D, AS is low.

Since it has already been established that the Q̄ output of flip-flop 200 is high and the Q output of flip-flop 214 is high, and the Q̄ output of flip-flop 207 is also high, AND gate 212 will output a high level signal on output lead 218 to one input of each of AND gates 238 and 246, the outputs of which in turn go to one input of OR gate 240 and OR gate 248. The outputs of OR gates 240 and 248 are respectively a READ ENABLE signal and a WRITE ENABLE signal which are supplied to the peripheral device 104 of FIG. 1.

It will be noted that AND gates 212, 238 and 246 are all shaded, which indicates that they are or can be activated during this particular response of the UIAC to the microprocessor of the type shown in FIG. 1.

As discussed above, during a read cycle the signal level of the R/$\overline{W}$ lead 262 is a high level signal as shown in waveform 6C and during a write cycle the signal level on the R/$\overline{W}$ lead 262 is a low level signal. Thus during a read cycle the AND gate 230 is enabled since both input signals supplied thereto are high level signals, the upper input signal thereto being a high level signal during the time period $t_2-t_3$ when the DS signal goes high. The output of AND gate 230 then completes the enabled ones of AND gate 238 to supply a high level signal through OR gate 240 which is, in fact, a READ ENABLE signal and is supplied to the peripheral device 104 shown in FIG. 1.

On the other hand, if a write function is to occur, then the signal level on lead 262 is a low level signal and the AND gate 232 is enabled to complete the enablement of AND gate 246, thereby supplying a high level signal through OR gate 248 to the WRITE ENABLE output lead 118.

At time $t_4$ in FIG. 6 another cycle of operation commences repeating the timing shown for the AS, R/$\overline{W}$, and DS signals.

Referring now to FIGS. 7 and 8, there is shown the logic diagram and the timing waveforms for the operation of the UIAC 122 of the architecture shown in FIG. 2 in response to the microprocessor 120 in the architectural arrangement of FIG. 2.

FIG. 7 is a multiplex bus arrangement represented as Case II in the chart of FIG. 13. In FIG. 7, the active logical elements include inverter 202A, NOR gate 204A, XOR gate 206A, AND gate 210A, OR gate 216A and AND gates 234A and 242A.

In the logic of FIG. 7, the address strobe as supplied to the X input of the circuit of FIG. 7 is shown in waveform 8A and occurs as pulse 270A between times $t_0$ and $t_1$. During the read cycle the $\overline{\text{read}}$ input from microprocessor 120 of FIG. 2 is supplied as a high level signal to the $\overline{\text{READ}}$ input Y of FIG. 7 when AS goes high so that the flip-flop 207A will have its Q output go high when the AS signal supplied to lead X goes high at time $t_0$ (FIG. 8) to produce an output pulse from XOR gate 206A which will clock flip-flop 207A. The AS signal pulse 270A of waveform 8A will also clock flip-flop 214A to produce a high level signal on the Q output thereof in response to the +V input signal supplied to the data (D) input of flip-flop 214A.

The Q output of flip-flop 200A will ultimately go low after AS pulses for the following reasons. If an AS pulse 270A should be occurring at the time of a reset pulse supplied to input 114, the Q output of flip-flop 200A will be high so that the output of inverter 202A will be low. When the AS pulse 270A goes low, both inputs to NOR gate 204A will be low producing a high output therefrom which will reset flip-flop 200A so that the $\overline{Q}$ output of flip-flop 200A goes high and will remain high. If the Q output of flip-flop 200A should be low at the end of the reset pulse, the output of inverter 202A will be high and NOR gate 204A will never produce a high output. However, if the Q output is in fact low, the $\overline{Q}$ output of flip-flop 200 must be high and it will stay high throughout the entire time of system operation unless the RESET signal is activated again.

Thus all three inputs to AND 210A are high after time $t_0$ so that the output thereof is a high level signal which is supplied through OR gate 216A to one input of each of AND gates 234A and 242A. During the read cycle the $\overline{\text{write}}$ signal on lead 262A is high as shown in waveform 8C so as to inhibit AND gate 242A and thus inhibit the WRITE ENABLE function.

When the read signal in waveform 8B becomes low between times $t_2$ and $t_3$ the AND gate 234A is fully enabled to produce a high level signal which is supplied through OR gate 240A as a READ ENABLE signal.

During the write cycle both the $\overline{\text{read}}$ and the $\overline{\text{write}}$ signal are initially high and the Q output of flip-flop 207A is caused to become high by a clock pulse from XOR gate 206A caused by the AS signal 270A of waveform 8A as discussed above.

The $\overline{Q}$ output of flip-flop 200A and the Q output of flip-flop 214A become high in the same manner described above in connection with waveforms 8B and 8C to cause the AND gate 210A to become fully enabled and to supply a high level signal through OR gate 216A to first inputs of AND gates 234A and 242A. However, in the write cycle it is the $\overline{\text{write}}$ signal on lead 262A that becomes a low level signal during the time period $t_2-t_3$ as shown in waveform 8E to fully enable AND gate 242A which will produce a high level signal which is supplied through OR gate 248A as a WRITE ENABLE signal. Since the $\overline{\text{read}}$ signal is high during the time period $t_2-t_3$ during the write cycle, AND cycle 234A is inhibited.

Referring now to FIGS. 9 and 10 there is shown the functional logic of the UIAC 132A and its response in the form of the timing waveforms of FIG. 10 to the type microprocessor 130 shown in FIG. 3.

FIG. 9 represents a non-multiplexed type of system as shown in the column labeled Case III of FIG. 13.

In FIG. 9, the active logic elements are AND gates 230B, 232B, 236B, 244B and OR gates 240B and 248B.

A data strobe signal 280, as shown in waveform 10B, is supplied to input Y of FIG. 9. A read/write (R/$\overline{W}$) signal is supplied to the common lead 262B and a constant high logic level voltage is supplied to input lead X of FIG. 9 as shown in waveform 10A. When the reset pulse is supplied to input lead 114 at the beginning of the system operation, the +V high level signal to data input D of flip-flop 200B causes the Q output of flip-flop 200B to go high while inverter 202B will invert such high Q output to a low level signal and supply such low level signal to one input of AND gate 204B. The other input to AND gate 204B will be a high voltage level since it is connected directly to the +V signal on input lead X. Therefore, flip-flop 200B will never be reset during the entire operation and the Q output will remain high. The high Q output will be supplied to one input of AND gates 236B and 244B to prime such AND gates. It will also be noted that since both inputs to XOR gate 206B are always high, there is no high level output from XOR gate 206B and flip-flop 207B is therefore never clocked by a signal from XOR gate 206B. Thus the state of flip-flop 207B is unknown and does not affect circuit operation in this mode. Since the $\overline{Q}$ output of flip-flop 200B is low, neither AND gate 210B nor 212B can become energized and are also not a functional part of the circuit in this mode of operation shown in FIG. 9.

It should be noted that unlike flip-flops 200B and 207B, which are edge-triggered master slave flip-flops, flip-flop 214B is a data following latch whose Q output is at the same logic level as its D input when its clock input is high. Flip-flop 214B is reset by the original reset pulse on input 114 causing its Q to go low and its $\overline{Q}$ to go high. At the end of the reset pulse, the high logic voltage level on input lead X is the active clock state which causes the Q output of flip-flop 214B to assume the high logic level of the D input. When the positive DS pulse 280 occurs, as shown in waveform 10B during the read cycle, AND gate 230B is completely enabled. It will be noted that during the read cycle the read/write (R/$\overline{W}$) lead 262B(Z) is a high level signal to prime AND gate 230B so that AND gate 230B will be completely enabled when the DS pulse 280 of waveform 10B goes high at time t$_0$. The output of AND gate 230B will enable AND gate 236B and supply a high level signal through OR gate 240B in the form of a READ ENABLE signal to output lead 116B.

During the write cycle the R/$\overline{W}$ lead 262B(Z) will be at a low level, as shown in waveform 10E, so that when the DS signal pulse 282 in waveform 10D occurs the AND gate 232B will be completely enabled to in turn enable AND gate 244B and supply a high level signal through OR gate 248B in the form of a WRITE ENABLE signal to output lead 118B.

Referring now to FIGS. 11 and 12 there is shown a form of the UIAC as employed with the microprocessor of the type shown in FIG. 4. FIG. 12 shows the timing waveforms of the operation of the logic of FIG. 11.

FIG. 11 is a non-multiplexed bus whose connections are set forth in the column labeled Case IV of FIG. 13. In FIG. 11 a low voltage level is supplied to the X input, a read input signal is supplied to the Y input, and a write input signal is supplied to the Z iput lead 262C as shown in waveforms 12C and 12E.

In both the read and the write cycles the $\overline{Q}$ output of flip-flop 200C is always high. This follows, because the input to the D terminal is a low voltage level which, upon reset, causes the Q output of flip-flop 200C to go low and remain low since no other signal occurs which will cause it to go to a high level. Since flip-flop 214C is reset by the original reset pulse on input 114 the $\overline{Q}$ output 215C thereof goes high and will remain high. This is true, because there is no clock signal which will cause the Q output of flip-flop 214C to go high, even though the signal supplied to data input D is a high logic voltage. Since the Q output of flip-flop 214C is thus a low value, both AND gates 210C and 212C will never become enabled and are, in effect, out of the circuit for this mode of operation of the universal adaptor circuit. Furthermore, since the Q output of flip-flop 200C is low, AND gates 236C and 244C can never become enabled.

On the other hand, since the $\overline{Q}$ output of flip-flop 214C is high, a high level signal is supplied through OR gate 216 to inputs of AND gates 234C and 242C.

The determination as to whether a READ ENABLE signal or a WRITE ENABLE signal will be generated at the output of OR gate 240C or 248C, is determined by whether a $\overline{read}$ or a $\overline{write}$ signal is supplied to the Y or the Z input leads 110C or 262C of FIG. 11. More specifically, if a $\overline{read}$ signal, shown as a negative pulse 286 in waveform 12B, is supplied to the input terminal Y of FIG. 11, then AND gate 234C is enabled to output a high level signal through OR gate 240C to output terminal 116C as a READ ENABLE signal. On the other hand, if a $\overline{write}$ signal occurs on input lead Z which is shown as negative pulse 288 in waveform 12E, then the AND gate 242C is enabled to produce a high level output through OR gate 248C to its output terminal 118C as a WRITE ENABLE signal.

It is to be understood that the read and write signals which are supplied to input leads Y and Z respectively are mutually exclusive and only one of them can occur during a given data transfer cycle.

What is claimed is:

1. A universal interface adapter circuit (UIAC) for connecting between any of four microprocessor types and a peripheral device of the type which functions in response to either a READ ENABLE signal or a WRITE ENABLE signal, the first and second of said four microprocessor types being employed in a multiplexed bus system and having an address strobe output terminal producing an address strobe signal which, when operative, alternates between a high level value and a low level value, said first and third microprocessor types having a read/write output terminal which, when operative, produces a signal the value of which determines whether a read of data or a write of data is occurring and has a data strobe output terminal which, when operative, produces a signal in the form of pulses to indicate when the read or write of data is occurring, said second and fourth microprocessor types having a read output terminal, which, when operative, produces a read output signal to indicate the timing of the read of data and having a write output terminal which, when operative, produces a write signal to indicate the timing of the write of data, the two signals being mutually exclusive, said universl interface adapter circuit comprising, in combination, a first input terminal connected to said address strobe signal terminal if either of said first and second microprocessor types is connected to said UIAC or connected to a constant level signal, the value of which is dependent on whether said third type or fourth type microprocessor is connected to said UIAC;

second and third input terminals connected respectively to said data strobe signal terminal and read/write signal terminal if either of said first and third microprocessor types is connected to said UIAC or connected respectively to said read and write signal terminals if either of said second and fourth microprocessor types is connected to said UIAC;

first means coupled to said first input terminal for generating a signal the value of which is determinative of whether or not said signal applied to said UIAC first terminal alternates in value and, therefore, for determining whether either of said first and second type microprocessor types is connected to said UIAC or whether either of said third and fourth microprocessor types is so connected;

second means responsive to the signal from said first means when it is of a value indicating that said microprocessor of either of said third and fourth type is connected to said UIAC and responsive to the value of signal at said first input terminal for producing a signal determinative of whether a third microprocessor type is connected to UIAC or whether a fourth microprocessor type is connected to said UIAC;

third means responsive to the signal from said first means, when it is of a value indicating said first or second microprocessor type is connected to said UIAC, and responsive to value of signal on said second output terminal for producing a signal determinative of whether said first microprocessor type is connected to said UIAC or said second microprocessor type is connected to said UIAC; and fourth means responsive to said signals indicative of which one of said four microprocessor types is connected to said UIAC and to a signal applied to said second and third terminals for producing said READ ENABLE or WRITE ENABLE signal.

2. The combination as set forth in claim 1 wherein said fourth means comprises an array of logic gates coupled to receive said signals, the output of said logic gates producing either said READ ENABLE signal or WRITE ENABLE signal.

3. The combination as set forth in claim 1 wherein said first means comprises a D type flip-flop with its data input terminal coupled to said first input terminal and further comprises a gate coupled to said first terminal and to an output of said flip-flop.

4. The combination as set forth in claim 3 wherein said second means comprises a second D type flip-flop coupled at its clock terminal to said first input terminal and further comprises a gate array coupled to an output of each of said first and second flip-flops.

5. The combination as set forth in claim 4 wherein said third means comprises a third D type flip-flop having its data terminal connected to said second input and having its clock terminal connected to the gate output of said first means.

6. The combination as set forth in claim 2 wherein said first means comprises a D type flip-flop with its data input terminal coupled to said first input terminal and further comprises a gate coupled to said first terminal and to an output of said flip-flop.

7. The combination as set forth in claim 3 wherein said second means comprises a second D type flip-flop coupled at its clock terminal to said first input terminal and further comprises a gate array coupled to an output of each of said first and second flip-flops.

8. The combination as set forth in claim 7 wherein said third means comprises a third D type flip-flop having its data terminal connected to said second input and having its clock terminal connected to the gate output of said first means.

* * * * *